US008780938B2

(12) United States Patent
Lerzer et al.

(10) Patent No.: US 8,780,938 B2
(45) Date of Patent: Jul. 15, 2014

(54) TECHNIQUE FOR COORDINATED RLC AND PDCP PROCESSING

(75) Inventors: Jürgen Lerzer, Neumarkt/OPf (DE); Stefan Meyer, Hoechstadt (DE); Stefan Strobl, Obermichelbach (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 729 days.

(21) Appl. No.: 12/763,518

(22) Filed: Apr. 20, 2010

(65) Prior Publication Data
US 2010/0274921 A1 Oct. 28, 2010

Related U.S. Application Data

(60) Provisional application No. 61/176,198, filed on May 7, 2009.

(30) Foreign Application Priority Data

Apr. 27, 2009 (EP) .................................... 09005846

(51) Int. Cl.
H04J 3/24 (2006.01)
(52) U.S. Cl.
USPC .......................................... 370/473; 370/474
(58) Field of Classification Search
USPC ......... 370/310–350, 389, 393, 469, 471, 473, 370/474
See application file for complete search history.

(56) References Cited

U.S. PATENT DOCUMENTS

| | | |
|---|---|---|
| 5,768,533 A | 6/1998 | Ran |
| 2001/0007137 A1 | 7/2001 | Suumaki et al. |
| 2001/0032325 A1 | 10/2001 | Fong et al. |
| 2005/0021874 A1 | 1/2005 | Georgiou et al. |
| 2005/0114574 A1 | 5/2005 | Okamoto et al. |
| 2007/0140123 A1 | 6/2007 | Fukui |
| 2007/0280158 A1 | 12/2007 | Qiu et al. |
| 2010/0070695 A1 | 3/2010 | Baek et al. |
| 2010/0080247 A1* | 4/2010 | Miettinen et al. ............. 370/474 |
| 2010/0158161 A1 | 6/2010 | Sambhwani et al. |
| 2010/0165937 A1* | 7/2010 | Yi et al. ........................ 370/329 |
| 2010/0208654 A1* | 8/2010 | Sampath et al. .............. 370/328 |

OTHER PUBLICATIONS

"RLC out of sequence delivery?" 3GPP Draft; R2-080831 RLC OOS Delivery, 3rd Generation Partnership Project (3GPP), Mobile Competence Centre; 650, Route Des Lucioles:. F-06921 Sophia-Antipolis Cedex: France, vol. RANWG2 no. Sorrento, Italy, Feb. 5, 2008.

* cited by examiner

Primary Examiner — Ricky Ngo
Assistant Examiner — Wei-Po Kao

(57) ABSTRACT

A technique for performing layer 2 processing is described. In a method implementation of this technique, at least one first RLC SDU is created from one or more first RLC PDUs. It is assumed here that the first RLC SDU belongs to an incomplete RLC SDU set that is to comprise at least one second RLC SDU, and that the second RLC SDU is to be created from at least one second RLC PDU not yet available. In a next step, a first PDCP function is applied to the first RLC SDU to create a data packet. The RLC function is only performed after the second RLC PDU has become available (or after an RLC time-out). Then, after the RLC function has been performed, the data packet is released to a second PDCP function.

18 Claims, 8 Drawing Sheets

600

602 — CREATE AT LEAST ONE FIRST RLC SDU FROM ONE OR MORE FIRST RLC PDUS, THE FIRST RLC SDU BELONGING TO AN INCOMPLETE RLC SDU SET THAT IS TO COMPRISE AT LEAST ONE SECOND RLC SDU, WHEREIN THE SECOND RLC SDU IS TO BE CREATED FROM AT LEAST ONE SECOND RLC PDU NOT YET AVAILABLE

604 — BEFORE PERFORM AT LEAST ONE RLC FUNCTION THAT DEPENDS ON BOTH THE FIRST RLC PDU AND THE SECOND RLC PDU, APPLY TO THE FIRST RLC SDU A FIRST PDCP FUNCTION TO CREATE A DATA PACKET

606 — AFTER THE SECOND RLC PDU HAS BECOME AVAILABLE OR AFTER AN RLC TIME-OUT, PERFORM THE RLC FUNCTION

608 — AFTER THE RLC FUNCTION HAS BEEN PERFORMED, RELEASE THE DATA PACKET TO A SECOND PDCP FUNCTION

Fig. 6

TECHNIQUE FOR COORDINATED RLC AND PDCP PROCESSING

CROSS-REFERENCE TO RELATED APPLICATIONS

This application claims the benefit of EP Application No. 09005846-2, filed Apr. 27, 2009, and U.S. Application No. 61/176,198, filed May 7, 2009, the disclosure of which is incorporated herein by reference.

TECHNICAL FIELD

The present invention relates in general to data processing system. More particularly, the present invention relates to networked data processing systems. Still more particularly, the present invention relates to communication between networked data processing systems.

BACKGROUND OF THE INVENTION

In mobile communication networks, the radio interface comprises layers 1 and 2 of the Open System Interconnection (OSI) reference model. Layer 1 is also called physical layer, while layer 2 is sometimes referred to as link layer. Mapping between transport channels and physical channels, spreading and modulation operations, power control and handover mechanisms are typical layer 1 functions. Layer 2 functions, on the other hand, provide the means to transfer data between network entities and to detect (and possibly correct) errors that may occur in layer 1.

In the specifications of modem Radio Access Networks (RANs), such as the Universal Mobile Telecommunication Services (UMTS) Terrestrial RAN (UTRAN) and its Long-Term Evolution (LTE) extension, layer 2 is split into several sub-layers. Each sub-layer is defined by a dedicated radio interface protocol, including the Medium Access Control (MAC) protocol, the RLC protocol and the PDCP. In brief, MAC processing includes mapping between logical channels and transport channels and error correction, RLC processing provides segmentation, concatenation and retransmission services, and PDCP processing comprises compression operations and access stratum security procedures.

BRIEF SUMMARY OF THE INVENTION

According to an embodiment of the present invention, a method of performing layer 2 processing is provided that comprises creating at least one first RLC SDU from one or more first RLC PDUs, the first RLC SDU belonging to an incomplete RLC SDU set that is to comprise at least one second RLC SDU, wherein the second RLC SOU is to be created from at least one second RLC PDU not yet available; before performing at least one RLC function that depends on both the first RLC and the second RLC PDU, applying to the first RLC SDU a first PDCP function to create a data packet; after the second RLC PDU has become available, or after an RLC time-out, performing the RLC function; and after the RLC function has been performed, releasing the data packet to a second PDCP function. By nesting the RLC and PDCP functions depending on the prevailing processing constraints, the data flow may be distributed more evenly (e.g., over different TTIs). As a result, peak data rates can be reduced and hardware requirements relaxed.

In one implementation, the RLC SDUs are ordered (e.g., by being associated with sequence numbers or similar order information). In such an implementation, the method may further comprise determining order information indicative of the position of at least one of the first RLC SDU and the second RLC SDU among the RLC SDUs, and providing the order information (or information derived therefrom) to the first PDCP function. The order information or the information derived therefrom may form the basis for calculating a processing parameter. The processing parameter may be a PDCP parameter such as the PDCP hyperframe number. Once the processing parameter has been calculated, the first PDCP function may be performed taking into account the processing parameter.

When the at least one second RLC PDU has become available (e.g., has been created by the responsible MAC function), the second RLC SDU may be created from the second RLC PDU to complete the RLC SDU set. The size of the RLC SDU set may be defined by an RLC reordering window size (e.g., of an RLC receiving or reordering window).

Once the second RLC SDU has been created, it may be released to at least one of the first PDCP function and the second PDCP function. This release may occur after the RLC function has been performed. The RLC function may also be performed between the first PDCP function and the second PDCP function to harmonize layer 2 processing of the second RLC SDU with layer 2 processing of the first RLC SDU.

In one configuration, at least one RLC PDU buffer is provided. The provision of a buffer permits the implementation of various buffering concepts, that may also be combined with each other. According to a first buffering concept, one or more third RLC PDUs comprising a fragment of the first or second RLC SDU are buffered until the first or second RLC PDU with the remaining fragment of the first or second RLC SDU becomes available. According to a second buffering concept, the first RLC PDU, from which the first RLC SDU is created (either alone or in combination with one or more buffered third RLC SDUs), is excluded from buffering. Moreover, according to a third buffering concept, one or more buffered third RLC PDUs, from which the first RLC SDU is created in combination with the first RLC PDU, are removed (e.g., purged) from the buffer.

The RLC PDU buffer may take the form of a reception buffer, a reordering buffer, a reassembly buffer, or any combination thereof (such as a reception and reordering buffer). In one hardware realization, the buffer is realized in an on-chip memory co-located on a single circuit chip with a processor performing the layer 2 processing. Additionally, an external memory accessible by the layer 2 processor via an external memory interface of the circuit chip may be provided. The data packets generated by the first PDCP function may for example be stored in the external memory. The external memory may also be configured as a buffer (e.g., as an RLC reassembly and/or PDCP processing buffer).

An association may be established between RLC PDUs buffered in the on-chip memory and data packets stored in the external memory. Such an association may, for example, be indicative of the overall sequence order of the RLC PDUs and the data packets. Based on such an association, an RLC reordering function can be applied jointly to the RLC PDUs and the data packets (e.g., to determine from the content of the on-chip memory and of the external memory if any RLC PDU is missing and needs to be retransmitted).

The first PDCP function may comprise one or more of the following processes: processing of PDCP header information, PDCP header removal, PDCP deciphering, PDCP integrity protection, and PDCP-based Internet Protocol (IP) header decompression. The second PDCP function, on the other hand, may comprise one or more of the following processes: PDCP deciphering, PDCP integrity protection, PDCP-based IP header decompression, PDCP reordering and PDCP data packet delivery to a protocol function above PDCP. The RLC function may comprise one or more of the following processes: RLC PDU reordering, RLC PDU loss control and RLC SDU in-sequence delivery. The RLC function as well as the first and second PDCP functions may be compliant with any mobile communication standard such as UMTS or its LTE extension.

According to another aspect, a computer program product is provided. The computer program product comprises program code portions for performing the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a mobile communication network or a wireless or wired Local Area Network (LAN).

According to a still further aspect, a layer 2 processor is provided. The layer 2 processor comprises a first module adapted to create at least one first RLC SDU from one or more first RLC PDUs, the first RLC PDU belonging to an incomplete RLC SDU set that is to comprise at least one second RLC SDU, wherein the second RLC SDU is to be created from at least one second RLC PDU not yet available; a second module adapted to apply, before performing at least one RLC function that depends on both the first RLC PDU and a second RLC PDU, to the first RLC SDU a first PDCP function to create a data packet; a third module adapted to perform, after the second RLC PDU has become available, or after an RLC timeout, the RLC function; and a fourth module adapted to release, after the RLC function has been performed, the data packet to a second PDCP function.

The layer 2 processor may be part of a layer 2 processing circuit chip that additionally comprises an on-chip memory co-located with the layer 2 processor on a single circuit chip. The on-chip memory may be configured as a buffer. As an example, the on-chip memory may take the form of a reception buffer for newly received RLC PDUs.

The layer 2 processing chip may further comprise a buffer controller adapted to control the buffering in accordance with one or more of the following buffering concepts. For example, the buffer controller may be adapted to selectively buffer one or more third RLC PDUs that comprise a fragment of the first or second RLC SDU until the first or second RLC PDU with the remaining fragment of the first or second RLC SDU becomes available. Additionally, or as an alternative, the buffer controller may be adapted to exclude the first RLC PDU, from which the first RLC SDU is created alone or in combination with one or more buffered third RLC PDUs, from buffering. Still further, or as another alternative, the buffer controller may be adapted to remove one or more buffered third RLC PDUs, from which the first RLC SDU is created in combination with the first RLC PDU.

Also provided is a processing system comprising the layer 2 processing circuit chip with an additional external memory interface. The processing system may further comprise an external memory coupled to the external memory interface and configured to store the data packets generated by the first PDCP function. The processing system may be integrated in a mobile terminal such as a mobile telephone, a laptop, or a data or network card.

BRIEF DESCRIPTION OF THE SEVERAL VIEWS OF THE DRAWING

In the following, the present technique will be described in more detail with reference to exemplary embodiments illustrated in the drawings, wherein

FIG. 6 illustrates a flow chart illustrating an embodiment;

DETAILED DESCRIPTION OF THE INVENTION

In the following description, for purposes of explanation and not limitation, specific details are set forth, such as specific device configurations and specific layer 2 processing scenarios in order to provide a thorough understanding of the technique disclosed herein. It will be apparent to one skilled in the art that the technique may be practiced in other embodiments that depart from these specific details. Moreover, while the following embodiments will primarily be described in relation to UMTS and its LTE extension, it will be readily apparent that the techniques described herein may also be practiced in context with other communication networks. Furthermore, while in the following reference will be made to specific RLC and PDCP functions, the techniques discussed herein can also be implemented using other RLC and PDCP functions.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in a computer processor and a memory coupled to the processor, wherein the memory stores one or more programs that perform the steps discussed herein when executed by the processor.

Figure 1:
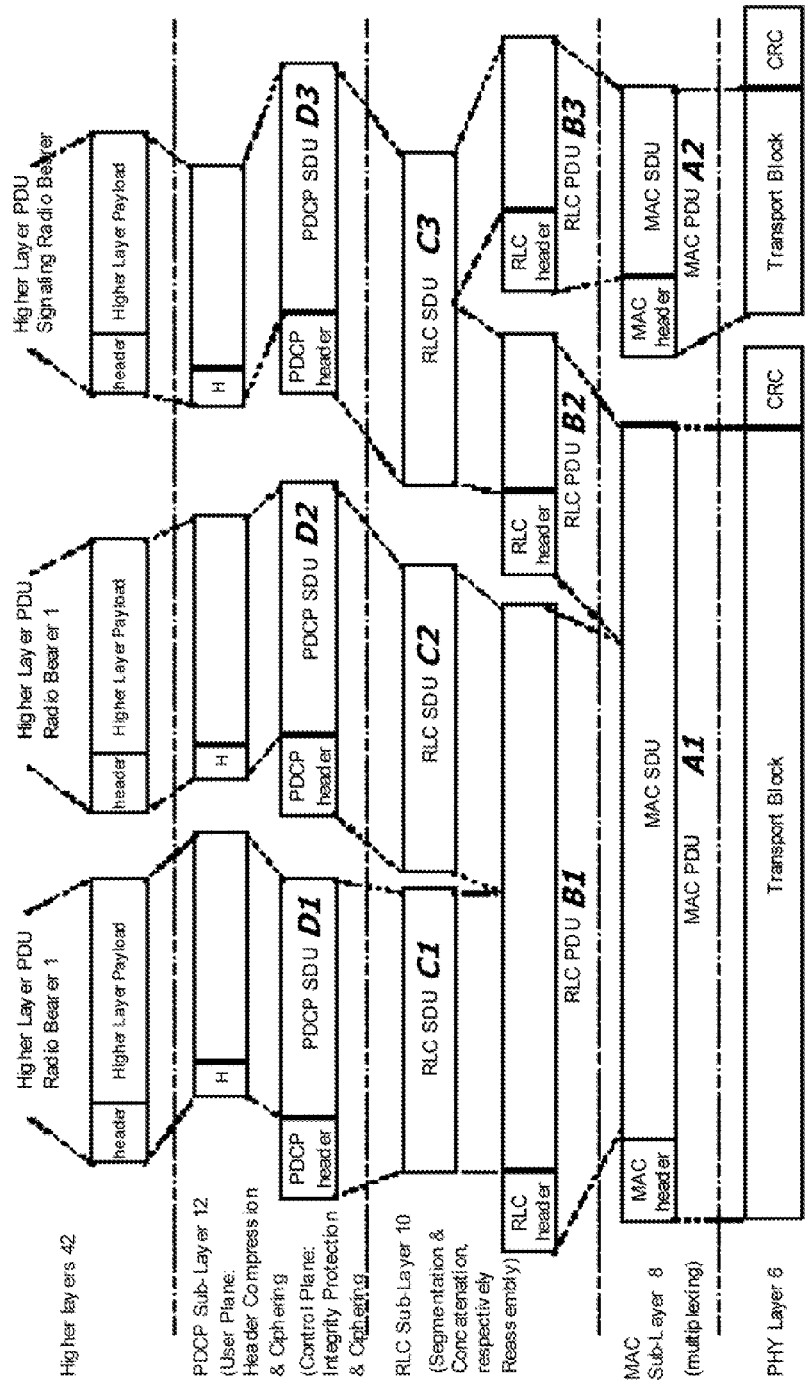
FIG. 1 illustrates the radio interface protocol stack for the uplink and downlink of an LTE-enabled network entity according to an embodiment.

Radio interface processing in an exemplary LTE—compliant network entity having a layered protocol stack as shown in FIG. 1 will now be discussed in more detail for the downlink direction in a receiving entity (such as a mobile terminal). In a first step, layer 1 functions ("PHY" layer 6 in FIG. 1) recover 0, 1 or more LTE Transport Blocks (TBs) per Transmission Time Interval (TTI) from the physical channels and deliver the recovered TBs via their associated transport channels to a MAC sub-layer 8. Functions on the MAC sub-layer 8 de-multiplex the transport channels and construct RLC Protocol Data Units (PDUs) from the received TBs. The RLC PDUs are then delivered from the MAC sub-layer 8 to an RLC sub-layer 10 on their associated logical channels, such as the Dedicated Control Channel (DCCH) and the Dedicated Traffic Channel (DTCH).

Figure 2:
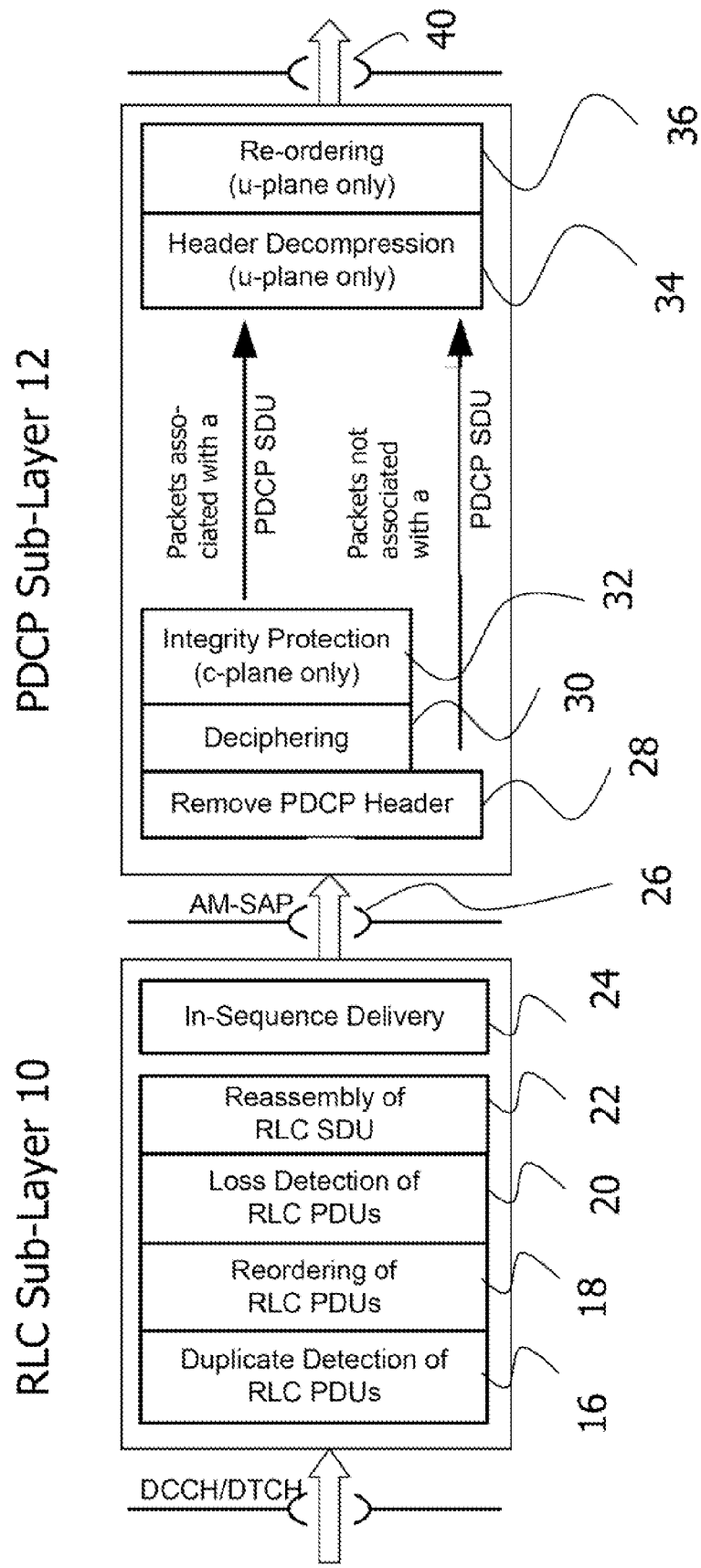
FIG. 2 illustrates processing functions of an RLC sub-layer and a PDCP sub-layer according to an embodiment.

FIG. 2 illustrates the processing operations performed, according to an embodiment, on the RLC sub-layer 10 and on an PDCP sub-layer 12 of FIG. 1 upon receipt of the RLC PDUs via the DCCH/DTCH in the Acknowledged Mode (AM) of the RLC sub-layer 10. The RLC sub-layer 10 and the PDCP sub-layer 12 belong to a layer 2 processing system of the LTE-compliant network entity.

On the RLC sub-layer 10, the RLC PDUs are received by a function 16 in charge of detecting (and discarding) duplicates of the received RLC PDUs before storing them in a reception and reordering buffer (not shown in FIG. 2). After a reordering function 18 of the RLC sub-layer 10 has reordered the buffered RLC PDUs, a loss detection function 20 analyses the reordered RLC PDUs to detect if any RLC PDU is missing. In the case of a missing RLC PDU, a reordering timer is started, and a STATUS Control PDU indicating the one or more missing RLC PDUs is sent in the uplink to trigger a retransmission.

The in-sequence RLC PDUs are moved from the reception and reordering buffer to a reassembly function 22. The reassembly function 22 processes the buffered in-sequence RLC PDUs to reassemble RLC Service Data Units (SDUs). A delivery function 24 then reads the reassembled RLC SDUs from the reassembly buffer and delivers them in sequence via an AM Service Access Point (AM-SAP) interface 26 to the PDCP sub-layer 12 as illustrated in FIG. 2.

On the PDCP sub-layer 12, the in-sequence RLC SDUs are received by a header removal function 28 in charge of removing the PDCP header from each RLC SDU to recover a PDCP SDU if possible. The following functions performed on the PDCP sub-layer 12 depend on whether or not the higher layer data packets are in fact associated with PDCP SDUs. In case PDCP SDUs can be recovered from the RLC PDUs, the PDCP SDUs are in a first step deciphered by a ciphering function 30 and then (in case of control plane processing only) subjected to an integrity protection operation performed by an integrity protection function 32.

The data packets corresponding to the deciphered user plane PDCP SDUs as well as the user plane data packets not associated with PDCP SDUs are then sent to an optional decompression function 34 for a decompression of the data packet headers. A subsequent reordering function 36 delivers the data packets with decompressed headers via a PDCP SAP interface 40 to higher protocol layers 42.

In the exemplary LTE scenario illustrated in FIGS. 1 and 2, the layer 2 functions generally have to complete their processing operation triggered in one TTI (of 1 ms) within 1 ms. Assuming an RLC receiving window size of for example 32 ms, it may happen that one RLC SDU is still missing while all RLC SDUs of the next 31 TTIs have already been received. As the delivery function 24 of the RLC sub-layer 10 is configured to deliver the RLC SDUs in sequence to the PDCP sub-layer 12, the 31 RLC SDUs already received are delivered to the PDCP sub-layer 12 only when the single missing RLC SDU is received (or when the RLC receiving window is outdated upon expiry of a timer). In such a case, all RLC SDUs received within the last 32 ms will have to be processed by the PDCP functions within the predefined processing window of 1 ms. Because of the resulting processing peak, the system architecture has to be designed with sufficient hardware resources.

As an example, the ciphering function 30 must have the capability of deciphering 3.2 Gbit/s for an average downlink data rate of 100 Mbit/s. A layer 2 processor executing the ciphering function 30 will thus have to be over-dimensioned from the viewpoint of the average ciphering load. Needless to say that the resulting over-dimensioning significantly adds to the hardware cost of the layer 2 processing system.

Figure 3:
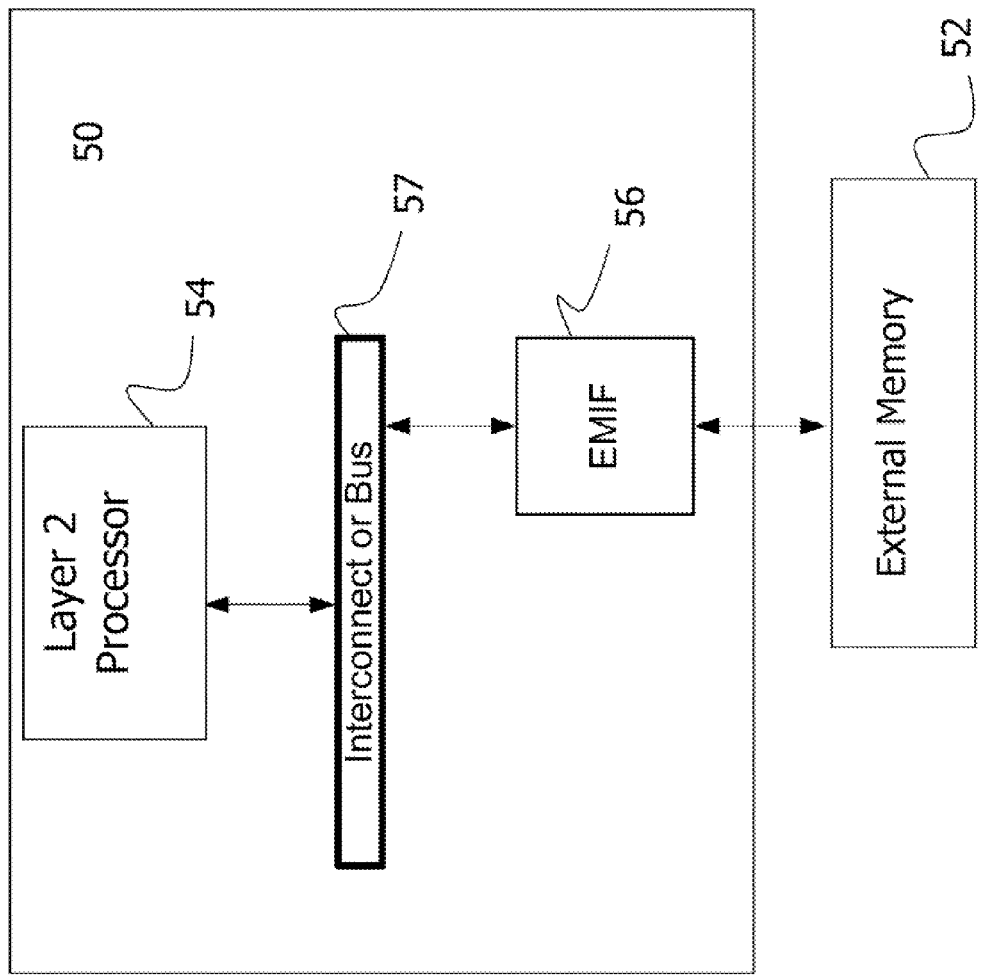
FIG. 3 is a block diagram of a layer 2 processing system comprising an external memory according to an embodiment.

The above processing scenario also necessitates an over-dimensioning of an interface between the layer 2 processor and a memory for storing the layer 2 data. For an average downlink data rate of 100 Mbit/s, the memory interface needs in an exemplary deployment the capability of handling a peak data rate of 9.6 Gbit/s within 1 ms. Such a high peak data rate is particularly costly to achieve in a system architecture relying on an external memory. FIG. 3 illustrates such an architecture of a layer 2 processing system comprising a circuit chip 50 and an external memory 52 coupled to a layer 2 processor 54 on the circuit chip 50 via an External Memory Interface (EMIF) 56.

In the architecture illustrated in FIG. 3, the layer 2 processor 54 accesses the EMIF 56 via an interconnect or bus 57, to which further processing components requiring access to the external memory 52 may be connected. Compared to internal memory interfaces, the EMIF 56 with the capability of handling a peak data rate of 9.6 Gbit/s is much costlier. On the other hand, the apparently obvious solution of replacing the external memory 52 with an on-chip memory is likewise costly for typical memory sizes of several Mbytes.

Figure 4:
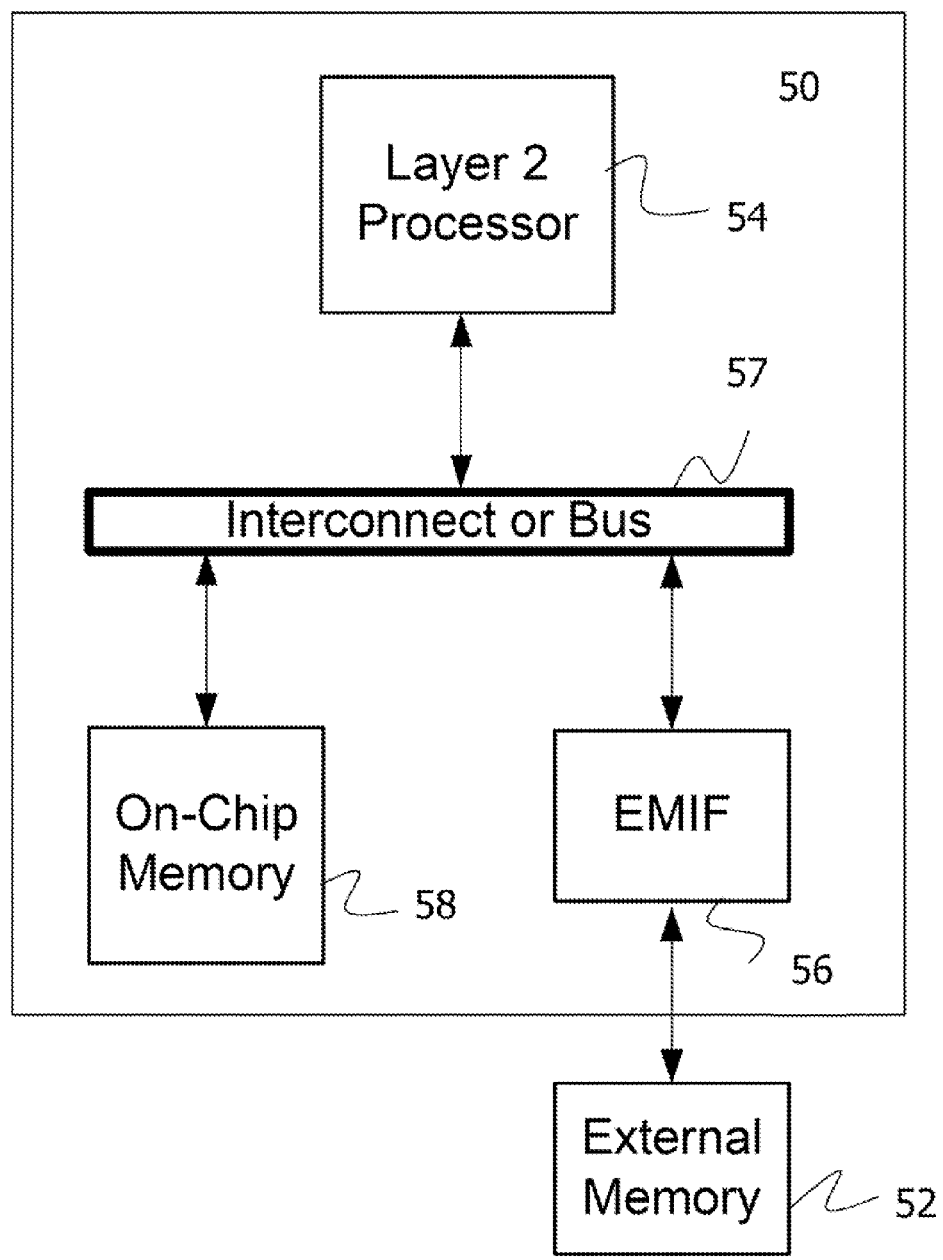
FIG. 4 is a block diagram of an embodiment of a layer 2 processing system according to an embodiment.

FIG. 4 shows an embodiment of a layer 2 processing system that has been derived from the system illustrated in FIG. 3, according to an embodiment. The same reference numerals as in FIG. 3 will therefore be used to designate the same or similar components.

In the system architecture illustrated in FIG. 4, an on-chip memory 58 of a circuit chip 50 is coupled to an interconnect or bus 57 in addition to an external memory 52. The external memory 52 is accessible from the circuit chip 50 via an EMIF 56. While the on-chip memory 58 is optional, it allows to reduce the usage of the EMIF 56 by a layer 2 processor 54. As a result, the EMIF 56 can be down-sized in relation to the supported peak data rate as will be discussed in more detail below.

Figure 5:
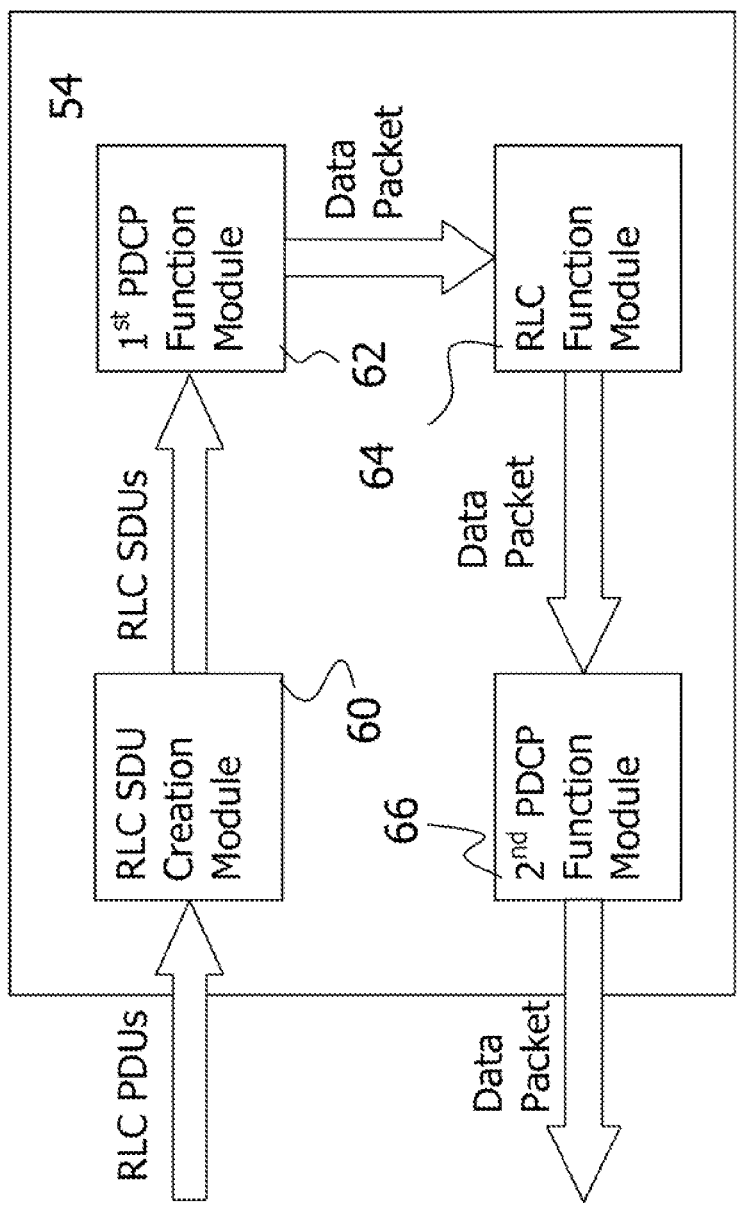
FIG. 5 is a block diagram illustrating an embodiment of a layer 2 processor according to an embodiment.

The internal configuration of the layer 2 processor of FIG. 4 is illustrated in FIG. 5, according to an embodiment. As shown in FIG. 5, the layer 2 processor 54 comprises an RLC SDU creation module 60, a module 62 adapted to perform at least one first PDCP function, a module 64 adapted to perform at least one RLC function, as well as another module 66 adapted to perform at least one second PDCP function.

The operation of the layer 2 processor 54 shown in FIGS. 4 and 5 will now be described with reference to the exemplary protocol stack of FIG. 1 and flow chart 600 of FIG. 6. Flow chart 600 illustrates an embodiment of the processing operations applied by the layer 2 processor 54 to a downlink data flow in a receiving entity (such as a mobile terminal).

After layer 1 processing of newly received downlink data has yielded a set of MAC PDUs, the layer 2 processor 54 executes MAC functions to recover RLC PDUs from the MAC PDUs. The RCL PDUs are generated in a reception and reordering buffer (not shown in FIGS. 4 and 5) defined within the on-chip memory 58. The RLC SDU creation module 60 of the layer 2 processor 54 processes the resulting RLC PDUs to create in step 602 at least one first RLC SDU from one or more buffered first RLC PDUs. The first RLC SDU belongs to an incomplete RLC SDU set that is to comprise at least one second RLC SDU, and the second RLC SDU is to be created from at least one second RLC PDU not yet available.

In the example illustrated in FIG. 1, the RLC SDU set may comprise RLC SDUs C1, C2 and C3 (plus one or more further RLC SDUs not shown in FIG. 1) and the size of the RLC SDU set may be defined by an RLC window. The RLC window may be an RLC receiving or reordering window. For example, the RLC window could be a reordering window or a receiving window that is to be utilized as exemplarily described in Sections 5.1.2.2 and 5.1.3.2, respectively, of the 3rd Generation Partnership Project (3GGP) Technical Specification 36.322 V8.5.0 (2009-03).

In the following it will be assumed that RLC PDUs B1 and B2 of FIG. 1 are already available for RLC processing, while RLC PDU B3 is not yet available (e.g., because MAC PDU A2 has not yet been received or not yet been processed by MAC sub-layer 8). In such a situation RLC SDUs C1 and C2 ("first RLC SDUs") can readily be created from RLC PDU B1 ("first RLC PDU"), while RLC SDU C3 ("second RLC SDU") cannot yet be created as RLC PDU B3 ("second RLC PDU") is still missing. In other words, the RLC SDU set comprising RLC SDUs C1, C2 and C3 will be incomplete as RLC SDU C3 still has to be created (from RLC PDU B2 and RLC PDU B3). It should be noted that FIG. 1 is in general not illustrative of any temporal relationship regarding reception or transmission of individual PDUs and individual SDUs. For this reason the specific numbering (such as RLC PDU B1, RLC PDU B2, etc.) is not necessarily indicative of any order in which a specific PDU or SDU is received or transmitted.

Returning to FIG. 6, the processing operation of the layer 2 processor 54 continues with the module 62 applying to the at least one first RLC SDU (i.e., to RLC SDUs C1 and C2 of FIG. 1) a first PDCP function to create in step 604 a data packet. As understood herein for the downlink context, a data packet is obtained by applying at least one PDCP function to an RLC SDU. This definition includes the case in which one or more further PDCP functions are applied to the data packet before the delivery of the data packet to higher layer functions.

The first PDCP function applied by the module 62 in step 604 may be any PDCP function defined in the applicable radio interface processing specification. In an exemplary UMTS scenario, the first PDCP function could, for example, be a PDCP header removal function. In an LTE scenario, the first PDCP function could additionally (or alternatively) comprise a deciphering function:

In the present embodiment, the module 62 applies the first PDCP function without waiting for the at least one second RLC SDU (i.e., RLC SDU C3 in FIG. 1) to become available. This means that the first PDCP function is applied before at least one RLC function that depends on both the first RLC PDU (RLC PDUs B1 and B2) and the second RLC PDU (RLC PDU B3) is performed. The RLC function depending on both the first RLC PDU and the second RLC PDU may process or at least analyze the RLC PDUs (and may comprise one or more of RLC reordering, RLC PDU loss detection and in-sequence delivery of RLC SDUs to the PDCP sub-layer 12). Depending on the memory configuration and settings, the data packet created by the first PDCP function in step 604 may be moved via the EMIF 56 to the external memory 52 (see. FIG. 4).

Once the second RLC SDU (i.e., RLC SDU C3 in FIG. 1) has been created (because RLC PDU B3 had become available, so that RLC SDU C3 could be assembled from RLC PDU B2 and RLC PDU B3), the RLC function module 64 applies in step 606 the RLC function. In the example of FIG. 1 the RLC function may depend on RLC PDUs B1, B2 and B3. If RLC PDU B3 should not become available during a predefined time interval, an RLC time-out occurs and the RLC function may be performed despite the fact that RLC SDU C3 cannot be created (but optionally taking into account the missing of RLC SDU C3). Alternatively, the whole incomplete RLC SDU set may be discarded upon the RLC time-out without performing the RLC function.

After the RLC function has been performed in step 606, the data packet to which the first PDCP function had been applied is released in step 608 to a second PDCP function (applied by module 66). At the same time, the second RLC SDU (i.e., RLC SDU C3 in FIG. 1) may also be released to at least one of the first PDCP function and the second PDCP function. Once PDCP processing has been completed, the resulting higher layer PDUs may be read from the external memory 52 by higher layer functions as is known in the art.

As has become apparent from the above, the first PDCP function is applied to assembled RLC SDUs without waiting for a completion of the associated RLC SDU set. In other words, application of the first PDCP function is not suspended until the complete RLC SDU set becomes available. As a consequence of the resulting nested RLC/PDCP processing, the PDCP processing load upon completion of the RLC SDU set can be reduced (as the first PDCP function has already been applied to essentially all RLC SDUs except for the last RLC SDU to complete the respective RLC SDU set).

Moreover, the approaches of initially buffering the newly generated RLC PDUs in the on-chip memory 58 (and thus, from a hardware perspective, close to the layer 2 processor 54) and of moving the data packets obtained by performing at least one of the PDCP functions to the external memory 52 advantageously reduce usage of the EMIF 56. Therefore, the data transfer demands in relation to the EMIF 56 are relaxed compared to a scenario in which no on-chip memory 58 is available and the RLC PDUs have to be stored externally from the circuit chip 50.

Regardless of whether any newly received RLC PDUs are buffered on-chip or externally, the buffering of RLC PDUs can be optimized in various ways as will now be explained with reference to FIG. 1. For example, RLC PDU B2 may only be buffered until RLC PDU B3 becomes available (and RLC SDU C3 can be created). This means that RLC PDU B2 can be purged from the buffer as soon as RLC PDU B3 can be processed. Moreover, RLC PDU B1 may be excluded from buffering as RLC SDU C1 and RLC SDU C2 can readily be created from RLC PDU B1 (and since RLC PDU B1 comprises no fragment of an RLC SDU that cannot yet be created). Should an RLC PDU allow the creation of one or more RLC SDUs and additionally comprise a fragment of an RLC SDU that cannot yet be created, this RLC PDU will remain buffered until the one or more remaining RLC SDU fragments become available. Despite the buffering of the RLC PDU, the one or more complete RLC SDUs contained therein can already be immediately processed as described herein.

Figure 7:
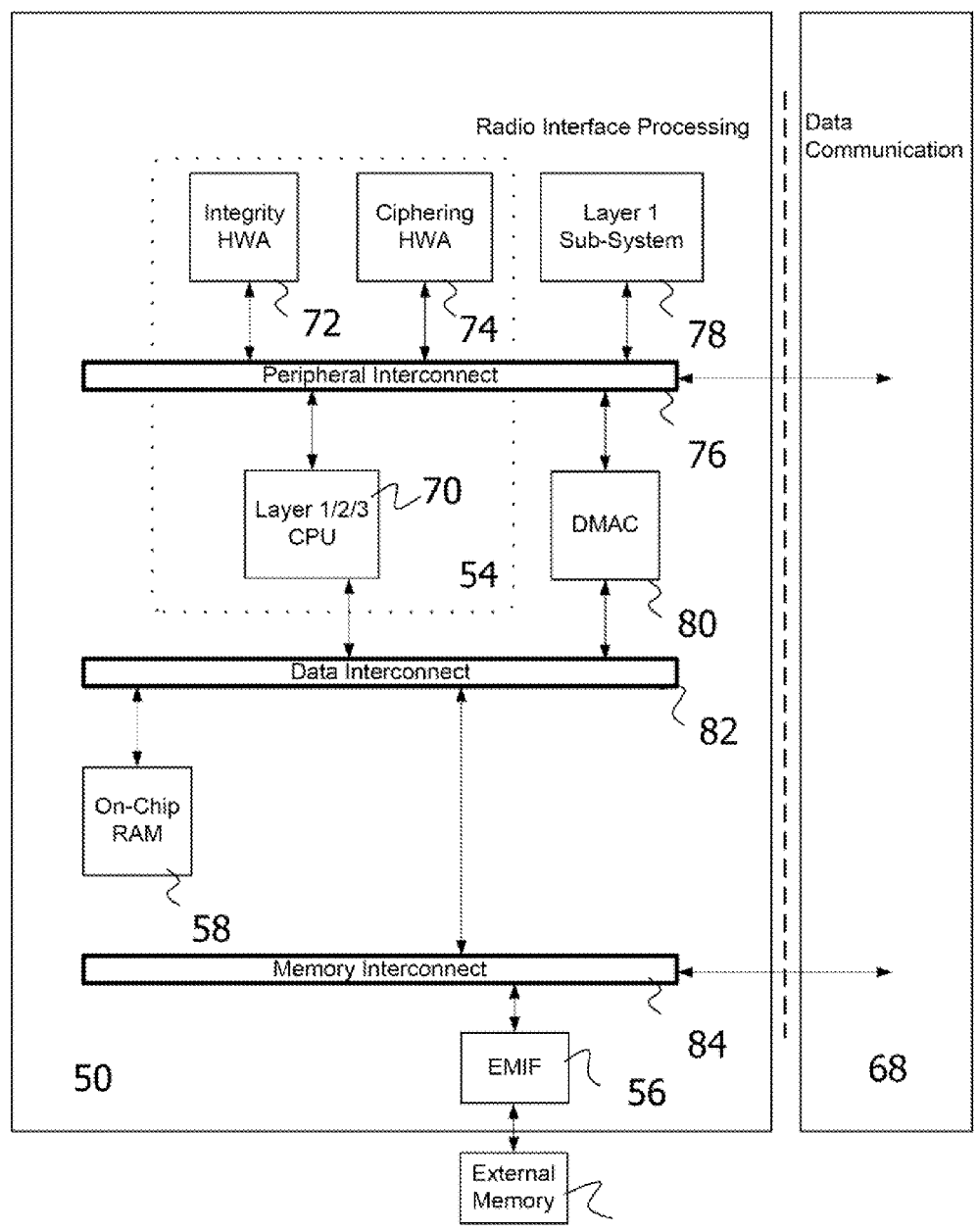
FIG. 7 is a block diagram illustrating an embodiment of a network entity comprising a layer 2 processing system.

In the following, a more detailed embodiment of a layer 2 processing system will be described with reference to FIG. 7. FIG. 7 illustrates the hardware architecture of a circuit chip 50 in the form of an exemplary LTE radio interface processing ASIC. The radio interface processing ASIC 50 is coupled to another circuit chip 68 (in the form of another ASIC) providing data communication functions. Such functions may, for example, comprise interface functionalities to an external device such as a stationary or mobile computer (e.g., to a laptop or to a Personal Computer). In an alternative embodiment, the circuit chip 50 and the circuit chip 68 could be implemented as sub-systems within a single ASIC.

The radio interface processing ASIC 50 is based on the hardware architecture discussed above in context with FIGS. 4 and 5, and for this reason the same reference numerals are used to designate the same or similar components. The core component of the ASIC 50 is a processor 54 comprising a Central Processing Unit (CPU) executing layer 1, layer 2 as well as layer 3 software functions, a first hardware accelerator 72 performing PDCP integrity protection as well as a second hardware accelerator 74 performing PDCP-based ciphering (including deciphering) functions. The CPU 70 as well as the two hardware accelerators 72, 74 are connected to a peripheral interconnect or bus 76. Also connected to the peripheral interconnect or bus 76 are a layer 1 sub-system 78 with hardware accelerators for layer 1 processing as well as a Direct Memory Access Controller (DMAC) 80 for a direct data transfer (bypassing the CPU 70) between memories and the hardware accelerators 72, 74, 78.

The CPU 70 as well as the DMAC 80 are additionally connected to a data interconnect or bus 82. Also connected to the data interconnect or bus 82 are an on-chip Random Access Memory (RAM) 58 having a size of approximately 0.3 to 2 Mbyte as well as a memory interconnect or bus 84. The memory interconnect or bus 84 essentially corresponds to the interconnect or bus 57 of FIG. 4 and provides access to an external memory 52 via an EMIF 56. The external memory 52 could be a flash memory, a RAM (e.g., an SDRAM), or a combination thereof with a size of approximately 1 to 10 Mbyte.

As illustrated in FIG. 7, the peripheral interconnect or bus 76 may be connected to a corresponding peripheral interconnect or bus (not shown) of the data communication side or shared with the data communication side. The same applies for the memory interconnect or bus 84.

Figure 8:
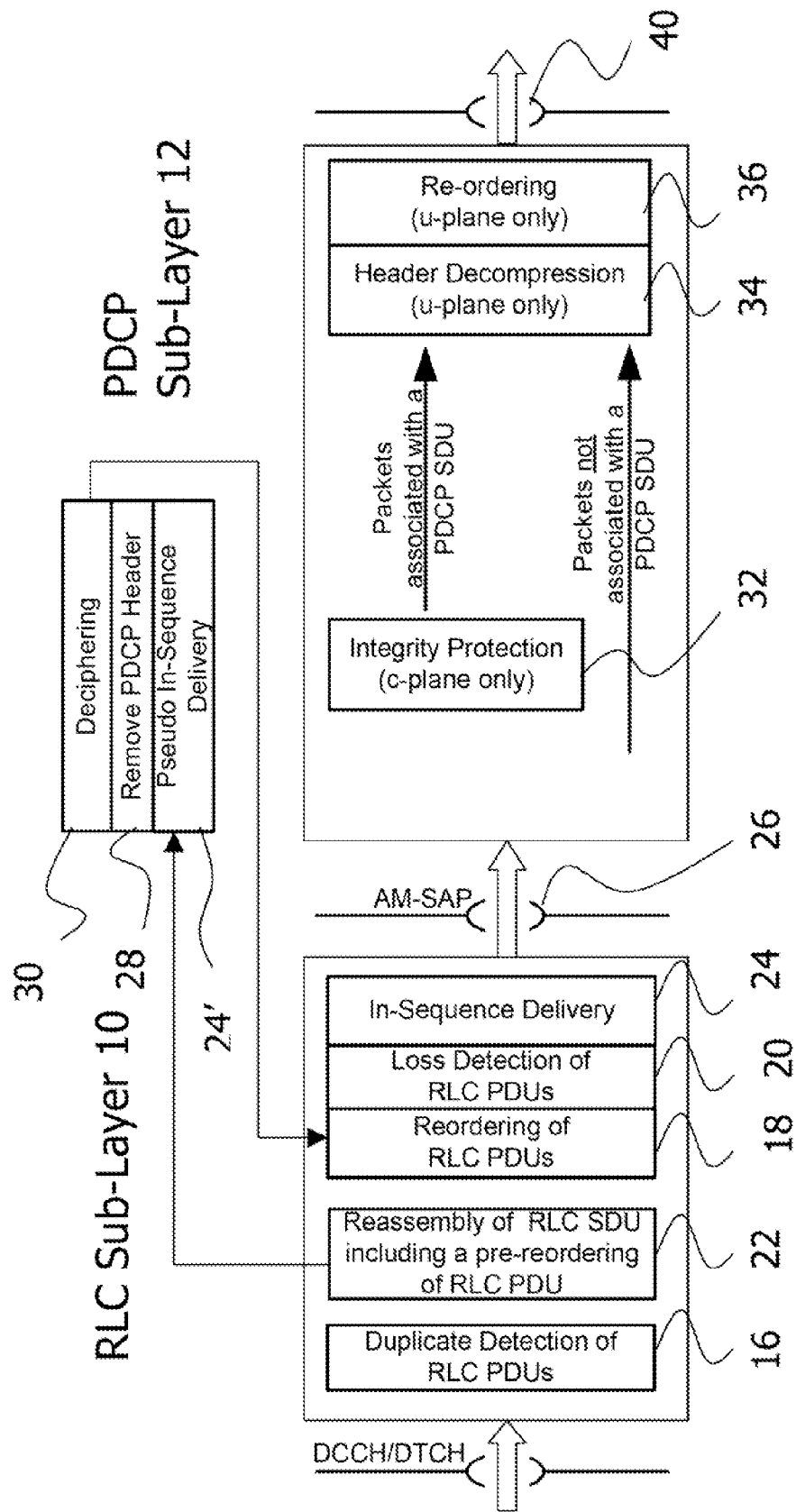
FIG. 8 illustrates an embodiment of re-arranged layer 2 processing functions.

In the following, the LTE layer 1/layer 2 downlink user data flow in the system architecture illustrated in FIG. 7 will be described with additional reference to FIGS. 1 and 8. FIG. 8 illustrates the modified layer 2 functions compared to the scenario discussed above with reference to FIG. 2. In FIG. 8, the same reference numerals as in FIG. 2 are used to denote the same or similar functions.

The downlink processing starts with Radio Frequency (RF) data arriving in the layer 1 sub-system 78. The layer 1 sub-system 78 converts the RF data to a downlink data stream of 100 Mbit/s with a TB size of two times 50.000 bits (for each TTI of 1 ms) for an exemplary LTE User Equipment (UE) of category 3 (CAT3). The layer 1 sub-system 78 then creates an interrupt notifying the CPU 70 that there is uplink control data and, optionally, uplink user data to be transmitted. The uplink control data may include acknowledgment information (Ack/Nack) for the uplink HARQ mechanism and other information. The interrupt to the CPU 70 also includes a notification that there now are downlink TBs ready to be processed by layer 2 functions. The interrupt is sent once for each TTI.

Responsive to the interrupt, the CPU 70 fetches and analysis the MAC and RLC headers for the newly received downlink TBs at a rate of approximately 1 to 2 Mbit/s (or roughly 1000 to 2000 bits per TTI). After having read the header parameters, the CPU 70 programs the DMAC 80 to shuffle the complete TBs (i.e., the MAC PDUs as shown in FIG. 1) from the layer 1 sub-system 78 to the on-chip RAM 58. This process is performed once every TTI. In response to being programmed by the CPU 70, the DMAC 80 transfers the newly received TBs from the layer 1 sub-system 78 to the on-chip RAM 58 at a rate of 100 Mbit/s (or 100 kbit per TTI). In the on-chip RAM 58, the TBs are temporarily stored in a reception buffer partition (not shown in FIG. 7).

Once the MAC PDUs have been transferred to the on-chip RAM 58, the CPU 70 applies the required MAC functions to the buffered MAC PDUs to remove the MAC headers, to demultiplex the received transport channels and to recover the RLC PDUs contained therein. The resulting RLC PDUs are then delivered to the RLC sub-layer 10 via the DCCH/DTCH as illustrated in FIG. 8. It should be noted that the RLC PDUs are delivered to the RLC sub-layer 10 with a zero-copy approach. This means that the removal of the MAC header and the demultiplexing in the MAC sub-layer is done by only manipulating pointers (i.e., without copying the RLC PDUs between different memory partitions within or outside the on-chip RAM 58).

On the RLC sub-layer 10, the RLC PDUs are first subjected to a duplicate detection function 16 as shown in FIG. 8 to identify and discard any RLC PDU duplicates. Then, a modified reassembly function 22 analyses each RLC PDU to determine if the RLC PDU contains a complete RLC SDU or if the RLC PDU at least contains an RLC SDU fragment which can be combined with one or more further RLC SDU fragments already buffered in the on-chip RAM 58 to complete an RLC SDU. In the exemplary scenario depicted in FIG. 1, the RLC PDU B1 contains two complete RLC SDUs C1 and C2. As a further example, RLC SDU C3 can be completed immediately upon receipt of RLC PDU B3 in case RLC PDU B2 is already buffered in the on-chip RAM 58.

In order to enable the reassembly of RLC SDUs, the reassembly function 22 is configured to do a pre-reordering of RLC PDUs. This pre-reordering may take into account that individual RLC PDUs have not yet been received from the MAC sub-layer.

It should be noted that the reassembly function 22 may be programmed such that each RLC PDU that contains one or more complete RLC SDUs (such as RLC PDU B1 in FIG. 1) is not transferred into the buffer of the on-chip RAM 58. Moreover, in case a buffered RLC PDU (such as RLC PDU B2 in FIG. 1) is needed to form a complete RLC SDU, this RLC PDU is immediately purged from the buffer once the RLC SDU has been created. Furthermore, the RLC PDU (such as RLC PDU B3 in FIG. 1) completing the RLC SDU will also not be transferred into the buffer if it can be combined with one or more already buffered RLC PDUs. As a result of this buffering concept, the on-chip RAM 58 may be kept small. As used in the present context, the term buffering is understood to designate the storing of a specific data item (such as an RLC SDU or an RLC PDU) for more than one TTI. If, on the other hand, the data item is stored for only up to one TTI, this storage does not qualify as buffering (even if the data item is at least partially stored in a memory area formally designated as buffer).

As shown in FIG. 8, all RLC SDUs which have been reassembled in a specific TTI (typically 8 or 9 packets of 1500 byte at a data rate of 100 Mbit/s) are delivered "pseudo in-sequence" by a new RLC function 24' to initial, PDCP processing (PDCP functions 28 and 30). Pseudo in-sequence delivery means that if there are RLC SDUs missing which normally would have to be delivered to the PDCP sub-layer 12 before the one or more RLC SDUs that could be completed during a specific TTI, the delivery function 24' indicates the sequence order of the completed RLC SDUs delivered to the following PDCP functions 28, 30. As order information, the number of missing RLC SDUs between two delivered RLC SDUs may be indicated. The corresponding order information enables the PDCP functions 28, 30 to correctly perform their processing tasks. As an example, PDCP deciphering requires calculation of the PDCP hyperframe number on the PDCP sub-layer 12. This calculation depends on the sequence order of the RLC SDUs. Therefore, gaps in the sequence order of the RLC SDUs delivered pseudo in-sequence to the PDCP sub-layer 12 have to be indicated.

The RLC SDUs completed in a specific TTI within the on-chip RAM 58 are subjected to PDCP processing in the same TTI. Specifically, the CPU 70 processes and removes the PDCP header (header removal function 28 in FIG. 8) and generates the corresponding IP data packets by creating within the on-chip RAM 58 the appropriate linked list referencing the constituting PDCP SDU fragments. The linked list allows to retrieve the PDCP SDU fragments from the on-chip RAM 58 for a subsequent deciphering by ciphering function 30.

After removal of the PDCP header and creation of the linked list, deciphering is initiated. To this end, the CPU 70 programs the DMAC 80 to perform a double DMA. A first DMA transfers the bits of each PDCP SDU in the right order from the on-chip RAM 58 to the ciphering hardware accelerator 74. The ciphering hardware accelerator 74 applies the ciphering function 30 to the received PDCP SDUs and transfers the deciphered bits via a second DMA (and via the EMIF 56) to the external memory 52. Transfer of the PDCP SDUs to the ciphering hardware accelerator 74 as well as transfer of the deciphered IP data packets to the EMIF 56 are performed at a rate of approximately two times 100 Mbit/s (or two times 100 kbit per TTI).

After the ciphering function 30 has been applied, RLC processing of the deciphered IP data packets (corresponding to PDCP SDUs) continues with performing a reordering function 18. Accordingly, in contrast to the RLC processing chain illustrated in FIG. 2, in the embodiment shown in FIG. 8 RLC reassembly, PDCP header removal and PDCP deciphering are performed before RLC reordering for such RLC SDUs which have been completed in the analyzed TTI. After the RLC PDUs have been reordered based on an RLC receiving or reordering window of a specific size (e.g., as described in Sections 5.1.2.2 and 5.1.3.2 of 3GPP TS 36.3222 V 8.5.0), a loss detection function 20 is executed to detect any missing RLC PDUs and trigger their retransmission. The retransmission mechanism is performed in a conventional manner.

It is important to note that the RLC reordering function 18 as well as the RLC loss detection function 20 are applied both to the incomplete RLC SDUs stored in the reception buffer of the on-chip RAM 58 and to the deciphered IP data packets stored in the external memory 52. To this end, an association between the buffered RLC PDUs (e.g. based on their sequence numbers as contained in the RLC PDU headers) and of the deciphered IP data packets (e.g., based on the corresponding sequence numbers of their PDCP headers) indicative of their sequence order will be established. The association can be stored in a table managed by the CPU 70.

The association is also useful in case an RLC PDU contains one or more complete RLC SDUs that may immediately be subjected to the PDCP functions 28 and 30 plus one or more RLC SDU fragments (so that the complete RLC PDU needs to be kept in the reception buffer until the remaining RLC SDU fragments become available). As long as the RLC processing of such an RLC PDU is not yet finished, the association between the buffered RLC PDU and its already PDCP-processed RLC SDUs (IP data packets) is maintained. The RLC PDU itself is purged from the buffer after the reordering function 18 has been successfully completed for this RLC PDU. In general, the association between the buffered RLC PDUs and the deciphered IP data packets is only deleted after the loss detection function 20 has successfully been performed.

After completion of the reordering and loss detection functions 18, 20, the deciphered IP data packets in the external memory 52 are released in-sequence by a delivery component 24 and via the AM-SAP interface 26 to the remaining processing functions on the PDCP sub-layer 12. These remaining PDCP functions include an integrity protection function 32 performed by the hardware accelerator 72, a header decompression function 34 as well as a reordering function 36 as explained above with reference to FIG. 2.

Once PDCP processing is finished, the CPU 70 informs a data communication CPU (not shown) of the data communication ASIC 68 that one or more IP data packets are available in the external memory 52 to be processed by higher layer functions. To this end, a handshake mechanism between the CPU 70 of the radio interface processing ASIC 50 and the data communication ASIC 68 is implemented to notify the data communication CPU accordingly. Upon receiving a corresponding notification signal, the data communication CPU initiates the required data communication functions. Such data communication functions may comprise reading the IP data packets from, the external memory 52 and transferring them via a Universal Serial Bus (USB) or other interface to another device.

It should be noted that the layer 2 downlink processing described above is not restricted to LTE-based processing and to the RLC AM. Rather, the downlink processing concept may also be applied in the context of other mobile communication standards as well as in the Unacknowledged Mode (UM) of RLC. The layer 2 processing approach discussed herein is particularly useful for the RLC UM in case of larger RLC reordering window sizes.

Moreover, in case of other mobile communication standards or in case ciphering/deciphering is disabled, the pseudo in-sequence delivery from the RLC sub-layer 10 to the PDCP functions (such as to the header removal function 28 of FIG. 8) might not be needed as the processing on the PDCP sub-layer 12 may be independent of any specific sequence order. Still further, the integrity protection function 32 (only for the control plane) and the header decompression function 34 (optional for the user plane) as well as the delivery of the resulting IP data packets to higher layers have been described as being performed after the RLC reordering and loss detection functions 18, 20 have been applied to the deciphered IP data packets. At least the integrity protection function 32 (and optionally the header decompression function 34) could also be performed before the RLC reordering and loss detection functions 18, 20. In such a case, only the PDCP reordering function 36 would be applied to the IP data packets received via the AM-SAP interface 26 before delivery of the IP data packets via the interface 40 to the higher layer functions.

The approach of performing one or more PDCP functions before performing the final RLC function has the advantage that the downlink data flow can be more evenly distributed over several TTIs. As a result, over-dimensioning of the hardware involved in the layer 2 processing and data transfer operations can be avoided. Additionally, layer 2 processing gets essentially independent from an RLC window size as all complete RLC SDUs can be processed immediately (i.e., without waiting for the reception of one or more missing RLC PDUs to complete the RLC SDU set defined by the RLC window).

In certain configurations it might be possible to omit a reassembly buffer. The omission of the reassembly buffer becomes possible because of the configuration of the reassembly function 22 described above with reference to FIG. 8. Specifically, the reassembly of RLC SDUs may be performed directly upon reading the constituting RLC PDUs from the receiving and reordering buffer.

It is expected that the technique presented herein allows to reduce (at an average downlink data rate of 100 Mbit/s and for an RLC window size of 32 ms) the required deciphering capabilities to 200 Mbit/s. Additionally, the data transfer capabilities of the EMIF 56 can be reduced to handling a peak data rate of only 600 Mbit/s within 1 ms. This assumption is based on a worst-case-scenario, in which each received RLC PDU contains an RLC SDU fragment, the remaining RLC SDU fragment has already been received, and both fragments to build the complete RLC SDU have approximately the same size.

Having thus described the downlink user data flow with reference to FIG. 8, the uplink user data flow (at an exemplary data rate of 50 Mbit/s) will now be explained. In this regard, reference will again be made to the system architecture depicted in FIG. 7 and an exemplary LTE scenario.

Initially, the CPU of the data communication ASIC 68 informs the CPU 70 of the radio interface processing ASIC 50 that one or more IP data packets stored in the external memory 52 need to be transmitted on the uplink. To this end, a handshake mechanism is implemented between the CPU 70 and its counterpart on the data communication ASIC 68 to inform the CPU 70 about the data ready for transmission. Upon receipt of a corresponding handshake signal, the CPU 70 reads information about the data to be transmitted. Such as the number of packets to be transmitted and their packet lengths. It will be assumed here that the handshake signal is received once every 4 ms.

The CPU 70 then essentially performs the opposite layer 2 processing steps as explained above with reference to FIGS. 2 and 8. Specifically, the CPU 70 starts with performing a first PDCP function to compress the IP headers (Robust Header Compression, RoHC) of the received IP data packets at a rate of approximately 1.5 Mbit/s. In a next step the CPU 70 generates within the on-chip RAM 58 the PDCP headers for the IP data packets (still stored in the external memory 52). Additionally, the RLC sub-layer 10 is informed about the PDCP PDUs that are to be transmitted (at a rate of approximately 0.1 Mbit/s).

Trigged by an interrupt from the layer 1 sub-system 78 as described above, the CPU 70 then generates the MAC and RLC headers for the data to be transmitted and stores the headers in the on-chip RAM 58 at a rate of 0.5 to 1 Mbit/s (or roughly 500 to 1000 bits per TTI). In a next step, the IP data packets as stored by the data communication ASIC 68 in the external memory 52 are transferred to the ciphering hardware accelerator 74 to generate the ciphered PDCP SDUs to be transmitted in the next TTI. The ciphered PDCP SDUs will be stored in a transmission buffer partition of the on-chip RAM 58. It is important to note that the MAC and RLC processing is performed before the PDCP-based ciphering function is applied by the ciphering hardware accelerator 74.

The transfer of the bits of the IP data packets from the external memory 52 via the ciphering hardware accelerator 74 to the on-chip RAM 58 will now be described in more detail. It should be noted that this transfer will be the same for each initial transmission (and each subsequent retransmission of non-fragmented PDCP SDUs). In a first step, CPU 70 creates the appropriate linked list indicative of the received IP data packets that were already subjected to IP header compression. Then, the CPU 70 programs the DMAC 80 to perform a double DMA. A first DMA transfers the bits of the IP data packets in the right order from the external memory 52 to the ciphering hardware accelerator 74. After the ciphering function has been applied, the ciphered bits are transferred via a second DMA into the transmission buffer partition of the on-chip RAM 58 for being transmitted. The transfer of IP data packets from the external memory 52 to the ciphering hardware accelerator 74 and of the ciphered PDCP SDUs to the transmission buffer in the on-chip RAM 58 is performed at a rate of two times 50 Mbit/s (corresponding to 2×50 kbit per TTI of 1 ms).

For the initial transmission and each retransmission, the CPU 70 is configured to generate the uplink TBs by creating the appropriate linked list containing the MAC headers, RLC headers, PDCP headers (completely or partially) and the ciphered PDCP SDUs (completely or partially). The CPU 70 then programs the DMAC 78 to transfer the TBs from the transmission buffer of the on-chip RAM 58 to a layer 1 common memory of the layer 1 sub-system 78. An RLC PDU belonging to a PDCP SDU transmitted in a single TB is immediately removed from the transmission buffer. An RLC PDU corresponding to a fragmented PDCP SDU (i.e., an PDCP SDU that is transmitted via different TBs), on the other hand, is kept in the transmission buffer portion until reception of the corresponding RLC PDUs is positively acknowledged by the RLC of the recipient, such as an eNode B. The transfer of TBs from the on-chip RAM 58 to the layer 1 sub-system 78 is performed at a rate of 50 Mbit/s (corresponding to 50 kbit per TTI).

An interrupt from the CPU 70 to the layer 1 sub-system 78 notifies the layer 1 sub-system 80 that one or more TBs are ready for transmission. The layer 1 sub-system 80 then converts the TBs to RF data and transmits the RF data to the recipient. These processes occur once per TTI. Then, the CPU 70 checks the RLC retransmission window and removes the IP data packets (non-fragmented PDCP SDUs) from the external memory 52 as well as the RLC PDUs corresponding to fragmented PDCP SDUs from the on-chip RAM 58 which fall out of the RLC transmission window.

As mentioned above, RLC PDUs corresponding to fragmented PDCP SDUs are kept in the transmission buffer until reception of the corresponding RLC PDUs is positively acknowledged by the receiving network entity. While the RLC PDUs of non-fragmented PDCP SDUs are also transmitted from the on-chip RAM 58, any subsequent retransmission requires reading the original PDCP SDUs again from the external memory 52, performing the ciphering (and, if needed, further PDCP/RLC) functions, and placing the regenerated RLC PDU again in the transmission buffer of the on-chip RAM 58 for retransmission. After the retransmission, the corresponding RLC PDU is again immediately purged without waiting for a possible acknowledgment, and so on.

In the example shown in FIG. 1, PDCP SDUs D1 and D2 are not fragmented as they will be transmitted via the single RLC PDU B1 in a single TB. For this reason, RLC PDU B1 will be purged from the transmission buffer of the on-chip RAM 58 immediately after transmission and without waiting for the receipt of RLC PDU B1 being positively acknowledged by the receiving network entity. In the case of a failed transmission, RLC PDU 81 is re-generated from the associated PDCP SDUs D1 and D2 stored in the external memory 52. The re-generation will involve, for example, a re-ciphering. The retransmission scenario is different for PDCP SDU D3, which will be transmitted in the form of two PDCP SDU fragments via RLC PDU B2 on the one hand and RLC PDU B3 on the other (and via two TBs). For this reason, the RLC PDUs B2 and B3 remain in the transmission buffer until a positive acknowledgment response is received.

By distributing the data storage in the context of layer 2 processing between an on-chip memory 58 on the one hand and an external memory 52 on the other, the usage of the EMIF 56 can be significantly reduced. One reason for this reduction in the above embodiments is the fact that data transfers between the layer 1 sub-system 78 to the ciphering hardware accelerator 74 and vice versa are kept within the radio interface processing ASIC 50.

As on-chip memories are generally rather costly, it is desirable to reduce the size of the on-chip memory 58 as far as possible. The sophisticated buffering and retransmission mechanisms described above, which synergistically rely on the memory resources available on-chip and externally, help to keep the required size of the on-chip memory 58 as small as possible.

It is expected that EMIF usage in the above embodiments can be decreased by 30% and more. As a result, the risk of having the EMIF 56 as bottleneck for achieving the high data rates requires for LTE and similar high-performance systems is reduced. Additionally, the reduced EMIF usage allows to exploit unused capacities of the EMIF 56 for other, parallel functionalities (e.g., for applications residing on the data communication ASIC 68 accessing the EMIF 56).

As a further advantageous result, layer 2 processing latency is reduced because data transfers to and from the on-chip memory 58 are much faster compared to the data transfers to the external memory 52 via the EMIF 56. Due to the reduced usage of the EMIF 56, the power consumption of the radio interface processing ASIC 50 is reduced also. The reduced processing latency and lower power consumption can be exploited to run additional functions or applications on the CPU 70.

In the foregoing, principles, embodiments and various modes of implementing the technique disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method of performing layer 2 processing, comprising:
creating, using a processor, at least one first Radio Link Control (RLC) Service Data Unit (SDU) from one or more first RLC Protocol Data Units (PDUs), the first RLC SDU belonging to an incomplete RLC SDU set that is to comprise at least one second RLC SDU, wherein the second RLC SDU is to be created from at least one second RLC PDU not yet available;
before performing at least one RLC function that depends on both the first RLC PDU and the second RLC PDU, applying, using the processor, to the first RLC SDU a first PDCP function to create a data packet;
after the second RLC PDU has become available or after an RLC time-out, performing, using the processor the RLC function; and
after the RLC function has been performed, releasing, using the processor the data packet to a second PDCP function.

2. The method of claim 1, wherein the RLC SDUs are ordered, and further comprising:
determining, using the processor, order information indicative of the position of at least one of the first RLC SDU and the second RLC SDU among the RLC SDUs; and
providing, using the processor, the order information or information derived therefrom to the first PDCP function.

3. The method of claim 2, further comprising:
calculating, using the processor, a processing parameter based on the order information or the information derived therefrom; and
performing, using the processor, the first PDCP function taking into account the processing parameter.

4. The method of claim 1, further comprising:
after the second RLC PDU has become available, creating, using the processor, the second RLC SDU from the second RLC PDU to complete the RLC SDU set; and
releasing, using the processor, the second RLC SDU to at least one of the first PDCP function and the second PDCP function.

5. The method of claim 1, further comprising:
selectively buffering, using the processor, one or more third RLC PDUs that comprise a fragment of the first or second RLC SDU until the first or second RLC PDU with the remaining fragment of the first or second RLC SDU becomes available;
excluding, using the processor, the first RLC PDU, from which the first RLC SDU is created alone or in combination with one or more buffered third RLC PDUs, from buffering; and
removing, using the processor, one or more buffered third RLC PDUs, from which the first RLC SDU is created in combination with the first RLC PDU, from the buffer.

6. The method of claim 1, further comprising buffering the RLC PDUs in an on-chip memory co-located with a processor performing the layer 2 processing on a single circuit chip.

7. The method of claim 6, further comprising storing, using the processor, the data packets generated by the first PDCP function in an external memory accessible by the processor via an external memory interface of the circuit chip.

8. The method of claim 6, further comprising establishing, using the processor, an association between the RLC PDUs buffered in the on-chip memory and the data packets stored in the external memory.

9. The method of claim 6, wherein based on an association between the RLC PDUs bettered in the on-chip memory and the data packets stored in the external memory, the RLC PDU reordering function is jointly applied, using the processor, to the RLC PDUs buffered in the on-chip memory and the data packets stored in the external memory.

10. The method of claim 1, wherein the RLC function comprises one or more of RLC PDU reordering, RLC PDU loss control and RLC SDU in-sequence delivery.

11. The method of claim 1, wherein
the first PDCP function comprises one or more of processing of PDCP header information, PDCP header removal, PDCP deciphering, PDCP integrity protection and PDCP-based IP header decompression; and/or
the second PDCP function comprises one or more of PDCP deciphering, PDCP integrity protection, PDCP-based IP header decompression, PDCP reordering and PDCP data packet delivery to a protocol function above PDCP.

12. The method of claim 1, wherein the size of the RLC SDU set is defined by an RLC window size.

13. The method of claim 1, wherein the RLC function and first and second PDCP functions are compliant with the Long Term Evolution, or LTE, standard.

14. A layer 2 processor, comprising:
a first module adapted to create at least one first Radio Link Control (RLC) Service Data Unit (SDU) from one or more first RLC Protocol Data Units (PDUs), the first RLC SDU belonging to an incomplete RLC SDU set that is to comprise at least one second RLC SDU, wherein the second RLC SDU is to be created from at least one second RLC PDU not yet available;

a second module adapted to apply, before performing at least one RLC function that depends on both the first RLC PDU and the second RLC PDU, to the first RLC SDU a first PDCP function to create a data packet;

a third module adapted to perform, after the second RLC PDU has become available or after an RLC time-out, the RLC function; and a fourth module adapted to release, after the RLC function has been performed, the data packet to a second PDCP function.

15. A layer 2 processing circuit chip, comprising
the layer 2 processor of claim 14;
an on-chip memory co-located with the layer 2 processor on a single circuit chip, the on-chip memory being configured as a buffer for buffering RLC PDUs.

16. The layer 2 processing chip of claim 15, the buffer is configured to:
selectively buffer, in the buffer, one or more third RLC PDUs that comprise a fragment of the first or second RLC SDU until the first or second RLC PDU with the remaining fragment of the first or second RLC SDU becomes available;
exclude the first RLC PDU, from which the first RLC SDU is created alone or in combination with one or more buffered third RLC PDUs, from buffering in the buffer; and
remove one or more buffered third RLC PDUs, from which the first RLC SDU is created in combination with the first RLC PDU, from the buffer.

17. A processing system, comprising
the layer 2 processing circuit chip of claim 15, the layer 2 processing circuit chip having an external memory interface;
an external memory coupled to the external memory interface and configured to store the data packets generated by the first PDCP function.

18. A mobile terminal comprising the processing system of claim 17.

* * * * *